(12) United States Patent
Ami et al.

(10) Patent No.: US 8,465,306 B2
(45) Date of Patent: Jun. 18, 2013

(54) POWER SUPPLYING APPARATUS

(75) Inventors: Yosihisa Ami, Tokyo (JP); Arinobu Ueda, Tokyo (JP); Makoto Kano, Fukushima (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 12/979,783

(22) Filed: Dec. 28, 2010

(65) Prior Publication Data

US 2011/0164351 A1 Jul. 7, 2011

(30) Foreign Application Priority Data

Jan. 6, 2010 (JP) ................ P2010-000994

(51) Int. Cl.
*H02B 1/26* (2006.01)
*H02J 7/00* (2006.01)
*H01R 13/44* (2006.01)

(52) U.S. Cl.
USPC ............ 439/140; 320/107; 439/141; 361/657

(58) Field of Classification Search
USPC ................ 361/657; 320/107; 439/140, 141
See application file for complete search history.

(56) References Cited

U.S. PATENT DOCUMENTS

| 7,839,119 | B2 * | 11/2010 | Onose ........................... 320/113 |
| 8,272,899 | B2 * | 9/2012 | Youssefi-Shams et al. ... 439/638 |
| 2008/0290834 | A1 | 11/2008 | Umetsu |
| 2009/0227122 | A1 * | 9/2009 | Jubelirer et al. ................ 439/11 |
| 2011/0199041 | A1 * | 8/2011 | Yang ............................. 320/101 |

FOREIGN PATENT DOCUMENTS

JP 2008-295129 12/2008

* cited by examiner

*Primary Examiner* — Zachary M Pape
(74) *Attorney, Agent, or Firm* — K&L Gates LLP (57) ABSTRACT

Disclosed herein is a power supplying apparatus including: a power supply section including a first power supply circuit, accommodated in a first cabinet with a box shape, for converting an alternative-current input into a direct-current output; an alternative-current power input section provided on the first cabinet; and a first connection section provided on the first cabinet; and an output section including a second power supply circuit accommodated in a second cabinet with a box shape, for converting the direct-current output into another direct-current output; a secondary battery accommodated in the second cabinet; a control section accommodated in the second cabinet; a direct-current power output section provided on the second cabinet; and a second connection section provided on the second cabinet to be joined to the first connection section.

7 Claims, 8 Drawing Sheets

POWER SUPPLYING APPARATUS

CROSS REFERENCES TO RELATED APPLICATIONS

The present application claims priority to Japanese Priority Patent Application JP 2010-000994 filed in the Japan Patent Office on Jan. 6, 2010, the entire content of which is hereby incorporated by reference.

BACKGROUND

The present application relates to a power supplying apparatus configured to include a freely mountable and dismountable power supply section electrically charged with commercial AC (Alternating Current) power in order to generate DC (Direct Current) power and a freely mountable and dismountable output section having an embedded secondary battery to be electrically charged with the DC power.

There has been known a contemporary USB (Universal Serial Bus) electrical charging AC power-supply adaptor capable of electrically charging a portable apparatus with commercial power through a USB port. In the following description, the commercial power is also referred to as AC power. Typical examples of the portable apparatus are a digital audio player, a hand phone and a game machine. In addition, there has also been used a USB power supplying apparatus which has an embedded secondary battery so that, even at a place with no available AC power, the USB power supplying apparatus is capable of electrically charging the portable apparatus with electrical power stored in the embedded secondary battery. An apparatus disclosed in Japanese Patent Laid-open No. 2008-295129 (hereinafter referred to as Patent Document 1) is a commonly known typical USB power supplying apparatus.

At a place where AC power is available, the typical USB power supplying apparatus disclosed in Patent Document 1 outputs direct-current power obtained by carrying out AC-DC conversion on the AC power to the portable apparatus through the USB port of the USB power supplying apparatus. At a place where AC power is unavailable, on the other hand, the typical USB power supplying apparatus disclosed in Patent Document 1 outputs power generated by the embedded secondary battery to the portable apparatus through the USB port. In the following description, the direct-current power is also referred to as DC power.

SUMMARY

As described above, even at an outdoor place where AC power is not available, the USB power supplying apparatus having an embedded secondary battery can be used for electrically charging a secondary battery embedded in a portable apparatus so that the USB power supplying apparatus can be regarded as a useful power supplying apparatus. Since the USB power supplying apparatus employs a power supply section for generating DC power from AC power and an output section for incorporating the embedded secondary battery, however, the USB power supplying apparatus raises problems that the size of the USB power supplying apparatus is undesirably large and the USB power supplying apparatus itself is inevitably heavy.

In order to solve the problems described above, the power supply section and the output section are incorporated in different cabinets so as to provide a configuration which allows each of the cabinets to be mounted onto and dismounted from the USB power supplying apparatus with a high degree of freedom. With such a configuration, even only the output section having the embedded secondary battery can be used for electrically charging a secondary battery embedded in a portable apparatus. That is to say, with such a configuration, when the user is carrying only the output section having the embedded secondary battery, the output section can be used as an electrical charger. In addition, the output section can be designed into a plurality of different configurations. For example, the output section can have an embedded secondary battery with a large or small electric-charge storage capacity. Thus, the user is allowed to select an output section having an embedded secondary battery with a large or small electric-charge storage capacity.

As described above, in a USB power supplying apparatus having a configuration which allows each of the cabinets of the power supply section and the output section to be mounted onto and dismounted from the USB power supplying apparatus with a high degree of freedom, the plug of the power supply section is generally inserted into the connection holes of an AC power outlet provided on a wall. It is feared, however, that the output section inadvertently falls off in some cases from the power supply section due to a gravitational force caused by the weight of the output section itself. In order to prevent the output section from falling off in some cases from the power supply section, it is necessary to firmly sustain the state of locking the output section and the power supply section to each other. With the firmly sustained state of locking the power supply section and the output section to each other, however, it is difficult to carry out an operation to change the state of locking the power supply section and the output section to each other to a state in which the power supply section and the output section are unlocked from each other. In consequence, the configuration allowing each of the cabinets to be mounted onto and dismounted from the USB power supplying apparatus with a high degree of freedom raises a problem that a large force is required to unlock the power supply section and the output section from each other.

Addressing the problems described above, inventors of the present application propose a power supplying apparatus having a DC power output terminal such as a USB port. In the proposed power supplying apparatus, even though the state of locking the power supply section and the output section to each other can be sustained firmly, the power supply section and the output section are unlocked from each other with ease.

In order to solve the problems described above, the present application provides a power supplying apparatus employing: a power supply section and an output section.

The power supply section includes a first power supply circuit, accommodated in a first cabinet with a box shape, for converting an alternative-current input into a direct-current output; an alternative-current power input section provided on the first cabinet to; and a first connection section provided on the first cabinet.

The output section includes a second power supply circuit accommodated in a second cabinet with a box shape, for converting the direct-current input into another direct-current output; a secondary battery accommodated in the second cabinet; a control section accommodated in the second cabinet; a direct-current power output section provided on the second cabinet; and a second connection section provided on the second cabinet to be joined to the first connection section.

In the power supplying apparatus, each of the first and second cabinets provided for the power supply section and the output section respectively can be mounted and dismounted with a high degree of freedom.

The first connection section is a protrusion protruding out off the front surface of a specific one of the first and second cabinets.

The second connection section is a hollow created on the front surface of the other one of the first and second cabinets to serve as a hollow to be engaged with the protrusion.

The protrusion is an approximately oblong-shaped pole having a plurality of contact points.

The hollow is extended from an opening provided on the front surface of the other one of the first and second cabinets in the inward direction and has a plurality of contact terminals each provided at a location in close proximity to the opening.

A lock pin is provided at each of four locations in close proximity to edge corners on each of the ceiling and bottom surfaces of the protrusion.

Each of the lock pins is biased by a spring so that each of the lock pins can each appear and sink with a high degree of freedom.

Each of lock projections is provided on the reverse side of the opening of the hollow at a location with which one of the lock pins is brought into contact.

When the protrusion is inserted into the hollow in an insertion direction, the lock pins are engaged with the lock projections respectively, preventing the protrusion from being pulled from the hollow in a direction opposite to the insertion direction.

When the protrusion is inclined with respect to the longitudinal direction of the protrusion, the two specific lock pins and the two lock projections are unlocked from each other so that the state of locking is ended.

It is desirable to provide the protrusion with a cutout groove which is continuous in a direction from the edge side to the stool side.

In addition, it is also desirable to provide the hollow with a bump, which is continuous in the inward direction and to be engaged with the cutout groove, at a location in close proximity to the opening of the hollow.

On top of that, it is also desirable to provide the contact points on the bottom surface of the cutout groove.

Furthermore, it is also desirable to provide the contact terminals on the upper surface of the bump.

In addition, the width on the edge side of the cutout groove is made slightly large in comparison with the width on the stool side of the cutout groove. On the edge side of the cutout groove, a gap is created between the groove wall of the cutout groove and the side wall of the bump.

A power supplying apparatus is configured to have a power supply section and an output section which can each be mounted on and dismounted from the USB power supplying apparatus with a high degree of freedom so that the apparatus can be applied to a small and light portable apparatus. In addition, the output section can have any of a plurality of different types. On top of that, even if a load is applied in the vertical direction in a state of locking the power supply section and the output section to each other, the state of locking the power supply section and the output section to each other is prevented from being changed to a state in which the power supply section and the output section are unlocked from each other. If a load is applied to incline the power supply section to the right-hand or left-hand side with respect to the vertical direction in the state of locking the power supply section and the output section to each other, on the other hand, the power supplying section and the output section are easily unlocked from each other. Thus, in a state in which the power supply section is connected to an AC commercial power supply in order to electrically charge a secondary battery embedded in the output section joined to the power supply section, it is possible to prevent the output section from falling off from the power supply section due to a gravitational force caused by the weight of the output section itself. In addition, the power supply section and the output section can be easily unlocked from each other.

Additional features and advantages are described herein, and will be apparent from the following Detailed Description and the figures.

DETAILED DESCRIPTION

Embodiments of the present application will be described below in detail with reference to the drawings.

The embodiments are explained in chapters arranged in the following order.

1: First Embodiment
2: Modified Versions

1: First Embodiment

Outline of Circuit Configuration

Figure 1:
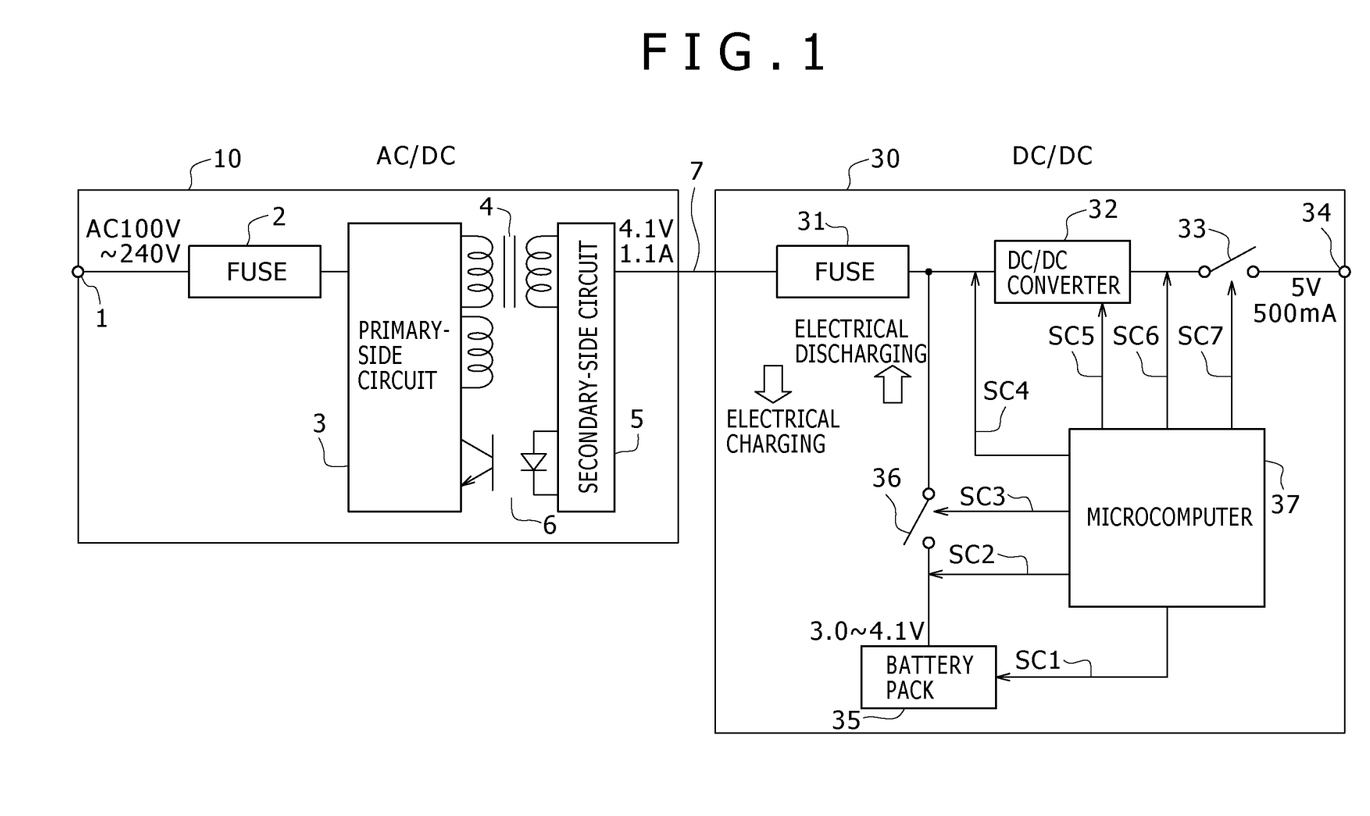
FIG. 1 is a block diagram showing an outline of a circuit configuration according to a first embodiment.

A power supplying apparatus according to a first embodiment has a rough circuit configuration like one shown in FIG. 1. As shown in FIG. 1, the USB power supplying apparatus employs a power supply module 10 serving as a power supply section and an output module 30 which serves as an output section. The power supply module 10 and the output module 30 are accommodated in different cabinets which can each be mounted on the USB power supplying apparatus and dismounted from the USB power supplying apparatus with a high degree of freedom.

In the power supply module 10, a primary-side circuit 3 is connected to an AC-power input terminal 1 through a fuse 2. In actuality, the AC-power input terminal 1 is a plug. AC power supplied to the power supply module 10 has a voltage in the range 100 V to 240 V and a frequency of 50 Hz or 60 Hz. The power supply module 10 also employs a secondary-side circuit 5 connected to the primary-side circuit 3 through a transformer 4. The primary-side circuit 3 and the secondary-side circuit 5 form a first power supply circuit which is typically a switching power supply circuit. The secondary-side circuit 5 generates a DC output having a predetermined voltage of typically 4.1 V and a predetermined current of typically 1.1 A. The secondary-side circuit 5 feeds back information on the output voltage and the output current to the primary-side circuit 3 by way of a photo coupler 6.

The primary-side circuit 3 employs an input filter, a rectification circuit, a switching transistor and a pulse-width modulation control circuit. The input filter and the rectification circuit are components for rectifying an AC power supplied to the primary-side circuit 3. The pulse-width modulation control circuit is a circuit for generating driving pulses to be supplied to the switching transistor. The duty ratio of the driving pulse is controlled by a detection signal, which is supplied by the secondary-side circuit 5 to the primary-side circuit 3 by way of the photo coupler 6 as the information cited above, in order to generate the DC output having the predetermined voltage and the predetermined current from the secondary-side circuit 5. The secondary-side circuit 5 also employs a rectification circuit for rectifying a pulse signal which is supplied by the primary-side circuit 3 to the secondary-side circuit 5 by way of the transformer 4.

The DC power (that is, the DC output cited above) generated by the power supply module 10 is supplied to the output module 30 by way of a connector section 7. As will be described later, the connector section 7 is configured to have a first connection section employed in the power supply module 10 and a second connection section employed in the output module 30. In actuality, the first connection section employed in the power supply module 10 is a protrusion whereas the second connection section employed in the output module 30 is a hollow. The output module 30 employs a DC/DC converter 32 serving as a second power supply circuit. The power supply module 10 supplies the DC power to the DC/DC converter 32 by way of a fuse 31. The DC/DC converter 32 typically has the configuration of a switching power supply circuit which outputs another DC power to a DC-power output terminal 34 by way of a switch circuit 33.

The DC-power output terminal 34 is typically a USB port for outputting a DC power generated by the DC/DC converter 32 as a power having a voltage of 5 V and a current of 500 mA which matches USB specifications. The plug of a USB cable is inserted into the DC-power output terminal 34 which functions as the USB port. On the other hand, the other end of the USB cable is connected to a power supply connector employed by a portable apparatus. With the USB cable connecting the USB power supplying apparatus to the portable apparatus, a secondary battery employed in the portable apparatus is electrically charged. The USB port employs two power terminals and two communication terminals. In the first embodiment, the communication terminals are used along with the power terminals. By making use of the communication terminals, the output module 30 is capable of authenticating the portable apparatus to which the DC power is supplied. Thus, it is possible to provide a configuration in which the DC power is supplied to a portable apparatus which has been authenticated by the output module 30 if necessary. However, it is also possible to make use of only the power terminals.

The output module 30 also has an embedded battery pack 35 which employs a lithium-ion secondary battery and a battery protection circuit provided for the lithium-ion secondary battery. The battery protection circuit employed in the battery pack 35 has functions including an excessive electrical-charging protection function, an excessive electrical-discharging protection function and an overcurrent protection function. An overcurrent may flow at an electrical charging time and/or an electrical discharging time. In addition, the battery protection circuit also has a fuse. A switch circuit 36 connects the battery pack 35 to a line which connects the fuse 31 to the DC/DC converter 32.

When the switch circuit 36 is put in a turned-on state, the DC power generated by the power supply module 10 is electrically charged into the lithium-ion secondary battery employed in the battery pack 35. At the same time, a DC power is supplied to the DC-power output terminal 34. In addition, even if the power supply module 10 is not connected to the output module 30, the DC/DC converter 32 provides the DC-power output terminal 34 with a DC power generated by the lithium-ion secondary battery employed in the battery pack 35. It is to be noted that an operation to output a DC power to the DC-power output terminal 34 serving as the USB port is started by taking insertion of the plug of the USB cable connected to the portable apparatus into the USB port as a trigger.

The output module 30 also has a microcomputer 37 functioning as a control section. The microcomputer 37 is a control section for controlling electrical charging and protection operations carried out by the output module 30 and for controlling the switching operations of the switch circuits 33 and 36. The microcomputer 37 is driven by power supplied from the DC/DC converter 32.

The control operations carried out by the microcomputer 37 are explained as follows. The microcomputer 37 carries out control SC1 for protecting the battery pack 35 against overheating. In addition, the microcomputer 37 also carries out control SC2 for preventing a voltage output by the battery pack 35 from becoming an overvoltage or an undervoltage. On top of that, the microcomputer 37 also carries out control SC3 for controlling a switching operation performed by the switch circuit 36. As an example of the control SC3, in accordance with a $\Delta V$ detection method, when a fully electrically charged state of the lithium-ion secondary battery employed in the battery pack 35 is detected, the microcomputer 37 puts the switch circuit 36 in a turned-off state in order to terminate the electrical charging operation carried out on the lithium-ion secondary battery. Furthermore, the microcomputer 37 also carries out control SC4 for preventing an input voltage applied to the DC/DC converter 32 from becoming an overvoltage or an undervoltage. Moreover, the microcomputer 37 also carries out control SC5 for controlling the operation of the DC/DC converter 32. In addition, the microcomputer 37 also carries out control SC6 for preventing an output voltage generated by the DC/DC converter 32 from becoming an overvoltage or an undervoltage. On top of that, the microcomputer 37 also carries out control SC7 for controlling a switching operation performed by the switch circuit 33.

Configurations of Power Supply Module and its Connector Section

Figure 2A:
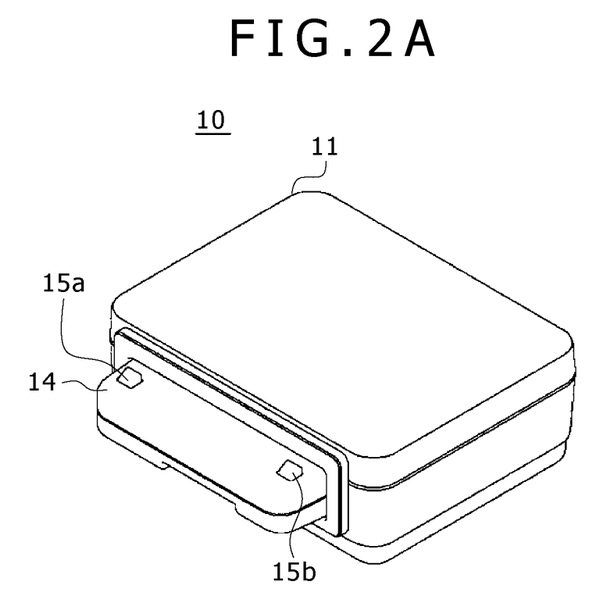
FIGS. 2A and 2B are diagrams each showing a perspective view of an external appearance of a power supply module according to the first embodiment.
Figure 2B:
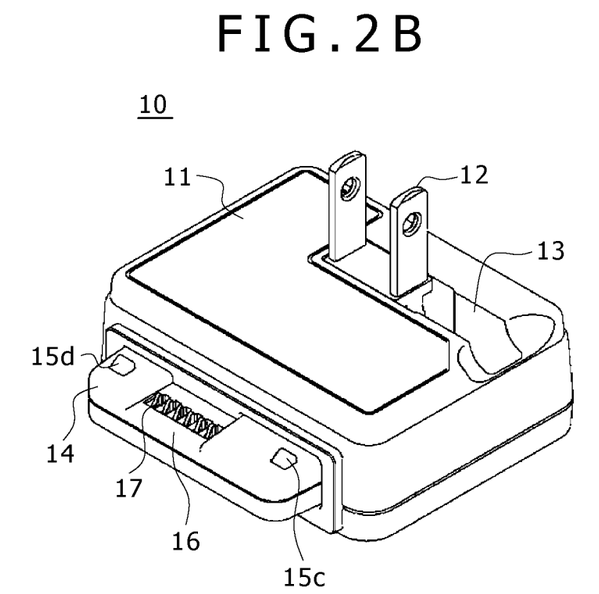

As shown in FIGS. 2A and 2B, the power supply module 10 employs a cabinet 11 having the shape of a box with a small thickness. The cabinet 11 is made from a synthetic resin material. On the bottom of the cabinet 11, a plug 12 is provided. The cabinet 11 is used for accommodating the circuit section of the power supply module 10 which has been explained earlier by referring to FIG. 1. The plug 12 can be rotated with a high degree of freedom so that the plug 12 can be accommodated in a plug accommodation groove 13 which is created on the bottom of the cabinet 11. The plug 12 is to be inserted into the connection holes of an AC power outlet or a power tap.

On the front surface of the cabinet 11, a rectangular opening is created. An insertion protrusion 14 protrudes out off this opening. The insertion protrusion 14 has the shape of an oblong pole. As shown in FIG. 2A, a pair of lock pins 15a and 15b are created at locations in close proximity to the corners on respectively the left-hand and right-hand sides of the edge of the ceiling surface (or the upper surface) of the insertion protrusion 14. By the same token, as shown in FIG. 2B, a pair of lock pins 15c and 15d are created at locations in close proximity to the corners on respectively the left-hand and right-hand sides of the edge of the bottom surface (or the lower surface) of the insertion protrusion 14. Each of the lock pins 15a to 15d protrudes as a chevron at a rectangular portion on a surface of the insertion protrusion 14. Each of these lock pins 15a to 15d is biased by a spring so that the lock pins 15a to 15d can each appear and sink with a high degree of freedom. Each of the lock pins 15a to 15d has an inclined surface which continuously becomes higher in the insertion direction to the vertex of the chevron.

In addition, at about the central position of the lower surface of the insertion protrusion 14, a cutout groove 16 which is continuous in the direction from the edge to the stool is created. Inside the cutout groove 16, mechanical spring contact points 17 are provided. Typically, six mechanical spring contact points 17 are provided. Two of the six mechanical spring contact points 17 are used for supplying DC power from the power supply module 10 to the output module 30. The four remaining mechanical spring contact points 17 are used for communications or the like between the power supply module 10 and the output module 30. Extended usage of the four remaining mechanical spring contact points 17 is recognition of the type of the output module 30. Typically, the type of the output module 30 is recognized in accordance with a combination of the four remaining mechanical spring contact points 17. The cutout groove 16 has a trapezoidal shape in which the width on the edge side is large to a certain degree in comparison with the width on the stool side. The insertion protrusion 14 has round corners at edges on the upper, lower, left-hand and right-hand sides.

Configurations of Output Module and its Connector Section

Figure 3A:
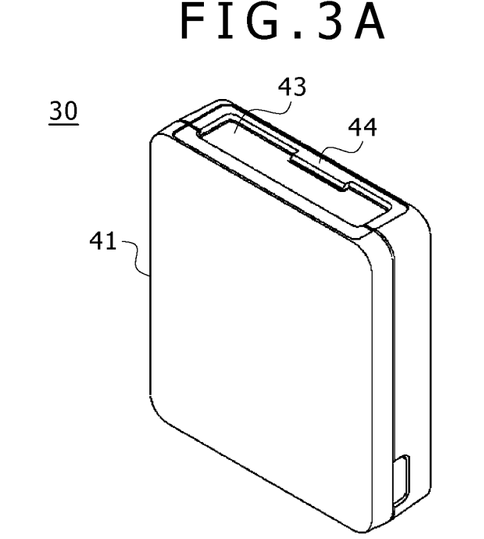
FIGS. 3A to 3C are diagrams each showing a perspective view of an external appearance of an output module according to the first embodiment.
Figure 3B:
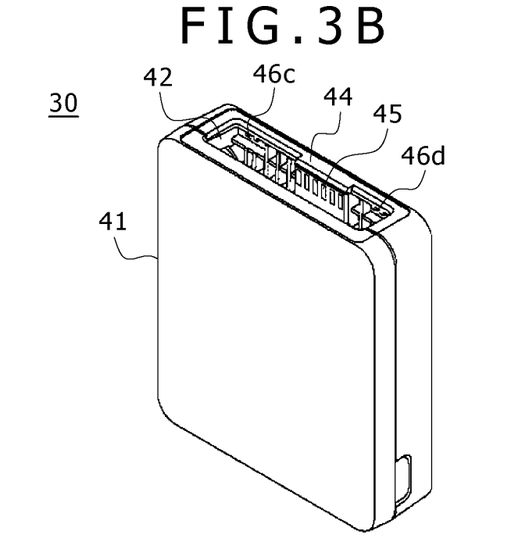
Figure 3C:
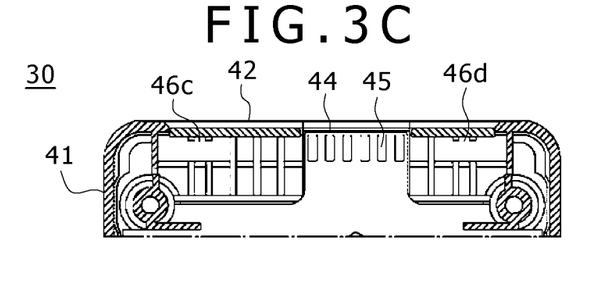

As shown in FIGS. 3A to 3C, the output module 30 employs a cabinet 41 having the shape of a box with a small thickness. The cabinet 41 is made from a synthetic resin material. The cabinet 41 is used for accommodating the circuit section and the battery pack 35 employed in the output module 30 which has been explained earlier by referring to FIG. 1. On the rear surface of the cabinet 41, the USB port not shown in FIG. 3 is provided. A changeover switch for cutting off and passing on the DC power is also provided on the rear surface of the cabinet 41.

As shown in FIG. 3B, on the front surface of the cabinet 41, an opening 42 is created by raising the edge portion of the surface. The insertion protrusion 14 employed in the power supply module 10 is inserted into a hollow which is extended from the opening 42 in the inward direction. The insertion protrusion 14 is inserted into the hollow to be put in a state of being engaged with the hollow. With the insertion protrusion 14 of the power supply module 10 not inserted into the hollow to be put in a state of being engaged with the hollow, the opening 42 is covered by a shutter 43 as shown in FIG. 3A. As the insertion protrusion 14 is inserted into the hollow, the shutter 43 is rotated around a longitudinal-direction axis of the insertion protrusion 14 to be put inside the hollow. The shutter 43 is biased by a spring so that, with the insertion protrusion 14 not inserted into the hollow, the opening 42 is covered by the shutter 43. FIG. 3B is a perspective-view diagram showing a state in which the shutter 43 has been rotated to be put inside the hollow.

A bump 44 extended in the inward direction is created at about the central position of an edge of the opening 42. The bump 44 has a shape which can be engaged with the cutout groove 16. On the top surface of the bump 44, six contact terminals 45 are provided. When the power supply module 10 and the output module 30 are joined to each other, the cutout groove 16 of the insertion protrusion 14 is engaged with the bump 44 so that each of the six spring contact points 17 provided in the cutout groove 16 is brought into contact with one of the contact terminals 45 provided on the bump 44. In this state, the DC power generated by the power supply module 10 is supplied to the output module 30 by way of the spring contact points 17 and the contact terminals 45.

As is obvious from the above description, the bump 44 has a positioning function and a guiding function which are carried out when the insertion protrusion 14 is inserted into the opening 42. The width of the bump 44 is equal to or slightly smaller than the stool-side width of the cutout groove 16. As explained before, the cutout groove 16 has a trapezoidal shape in which the width on the edge side is large to a certain degree in comparison with the width on the stool side. Thus, in a state in which the cutout groove 16 of the insertion protrusion 14 is engaged with the bump 44 of the hollow, on the edge side of the cutout groove 16, a gap is generated between a groove wall of the cutout groove 16 and a side wall of the bump 44. This gap is deliberately provided in order to assure a space through which the insertion protrusion 14 moves in an operation to change the state of locking the power supply module 10 and the output module 30 to each other to a state in which the power supply module 10 and the output module 30 are unlocked from each other.

On the reverse side of the opening 42, lock projections 46a, 46b, 46c and 46d are created at positions with which lock pins 15a, 15b, 15c and 15d are brought into contact respectively in a state in which the insertion protrusion 14 has been inserted into the hollow. Each of the lock projections 46a, 46b, 46c and 46d has a configuration of two plate-shaped ribs which are extended from an edge of the opening 42 in parallel to the direction of the insertion of the insertion protrusion 14. Each of the lock projections 46a, 46b, 46c and 46d is divided into the two plate-shaped ribs in order to make an unlock operation easy to carry out. The width of an inclined portion of each of the lock pins 15a, 15b, 15c and 15d is made large in comparison with the gap between the two plate-shaped ribs. The width of the inclined portion of each of the lock pins 15a, 15b, 15c and 15d is the width in a direction perpendicular to the direction of the insertion of the lock pins 15a, 15b, 15c and 15d. Thus, when the insertion protrusion 14 is inserted into the hollow, the inclined portion is pressed by the edge surface of the plate-shaped ribs. When the inclined portion is pressed by the edge surface of the plate-shaped ribs, the inclined portion sinks to the inner side so that the insertion protrusion 14 is inserted till the insertion protrusion 14 reaches a position determined in advance. In this state, each of the lock pins 15a, 15b, 15c and 15d is locked by the corners of the edges of the plate-shaped ribs in one of the lock projections 46a, 46b, 46c and 46d respectively in the so-called lock state. This lock state is not changed to a state in which the lock pins 15a, 15b, 15c and 15d are unlocked from the lock projections 46a, 46b, 46c and 46d respectively even if the power supply module 10 is pulled from the output module 30 in a direction opposite to the insertion direction. If the plug 12 employed in the power supply module 10 is inserted into an AC commercial power outlet, the weight of the output module 30 joined to the power supply module 10 is applied to serve as a gravitational force to the output module 30. By virtue of the lock mechanism described above, nevertheless, it is possible to prevent the output module 30 from falling off from the power supply module 10 due to a gravitational force caused by the weight of the output module 30 itself and/or small vibrations.

Figure 4A:
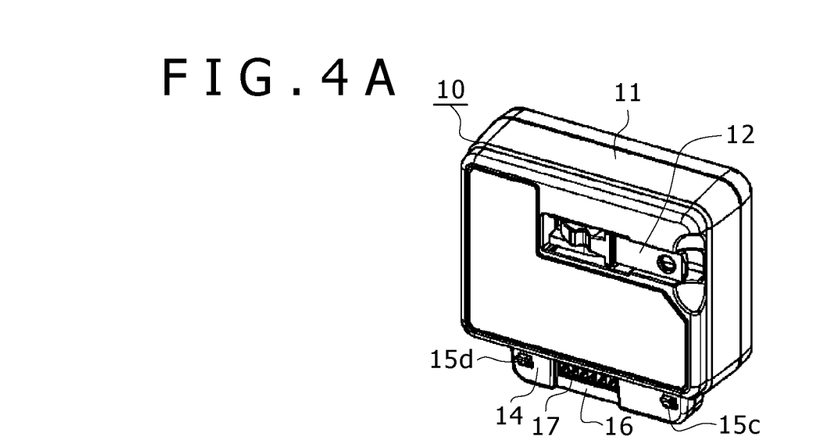
FIGS. 4A to 4C are explanatory perspective-view diagrams to be referred to in description of an operation to lock the power supply module and the output module according to the first embodiment to each other.
Figure 4B:
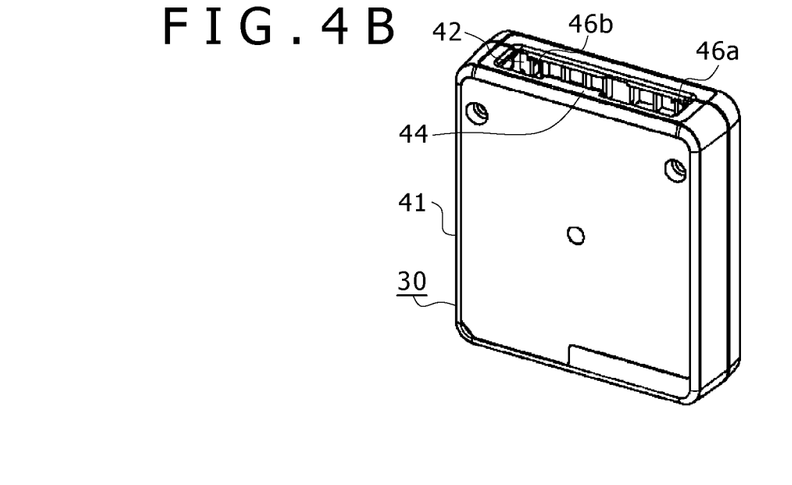
Figure 4C:
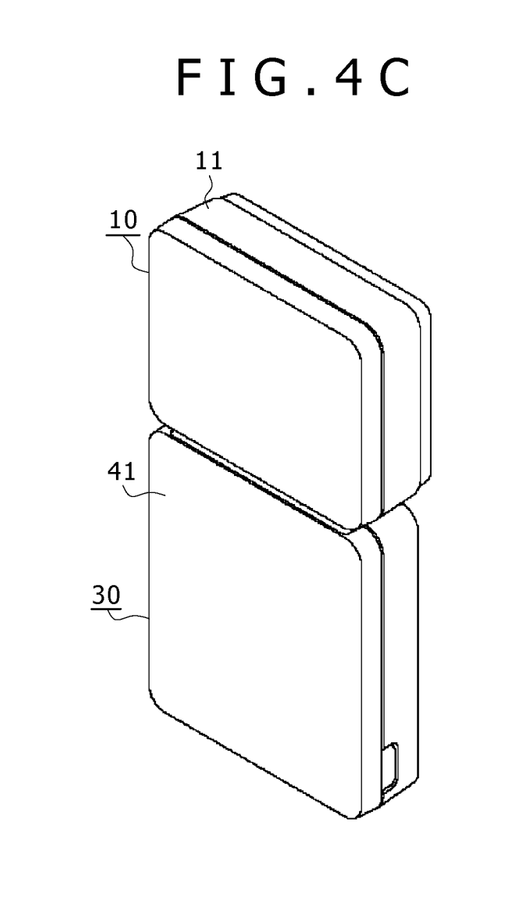

FIG. 4A is a perspective-view diagram showing an external appearance of the power supply module 10 viewed from a location on a side opposite to the position at which the surface is viewed as shown in FIG. 2A. In addition, FIG. 4B is a perspective-view diagram showing an external appearance of the output module 30 viewed from a location on a side opposite to the position at which the surface is viewed as shown in FIG. 3B. On top of that, FIG. 4C is a perspective-view diagram showing external appearances of the power supply module 10 and the output module 30 which have been joined to each other.

Unlocking Operations

Figure 5A:
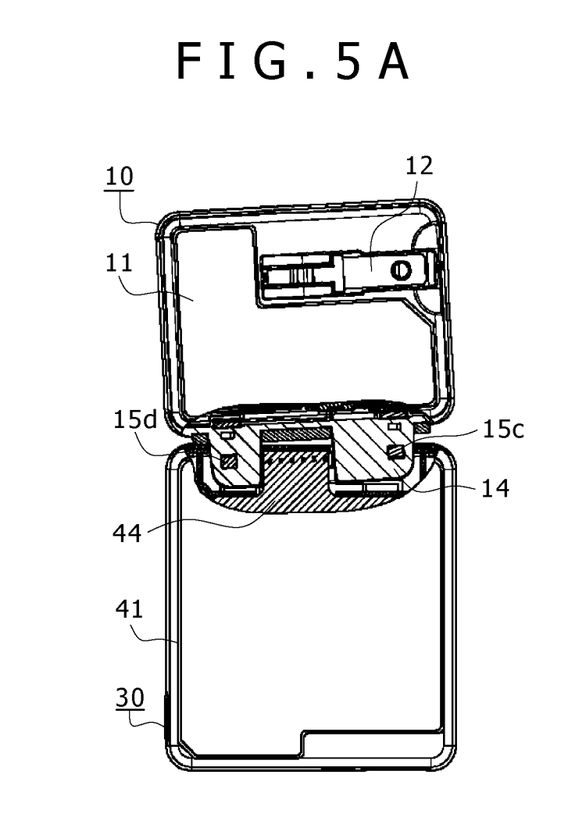
FIGS. 5A and 5B are explanatory rough diagrams to be referred to in description of an operation to unlock the power supply section and the output section from each other.
Figure 5B:
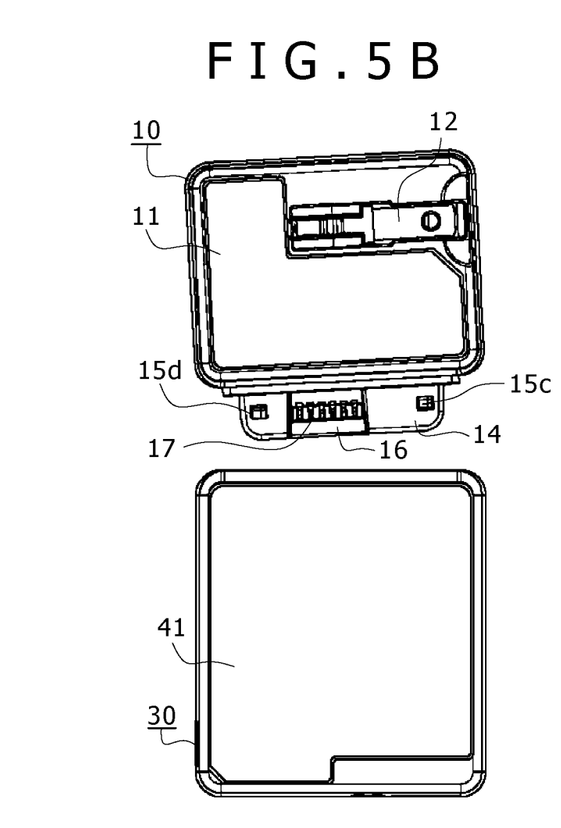

To unlock the power supply module 10 and the output module 30 from each other, as shown in FIG. 5A, a load is applied to incline the longitudinal direction of the power supply module 10 toward either the left-hand side of the insertion direction or the right-hand side of the insertion direction so as to incline the power supply module 10 with respect to the direction corresponds to the insertion direction. This operation causes a load to be applied to each of the lock pins 15a, 15b, 15c and 15d in a direction perpendicular to the insertion direction. In the case shown in the diagrams which serve as FIGS. 5A and 5B, the operation to incline the power supply module 10 causes the lock pin 15c to be taken off from the lock projection 46c so that the lock pin 15c and the lock projection 46c are unlocked from each other. A gap created between the cutout groove 16 and the bump 44 makes the operation to incline the power supply module 10 easy to carry out. In this case, by applying a small force, it is possible to carry out the operation to unlock the power supply module 10 and the output module 30 from each other.

Figure 6A:
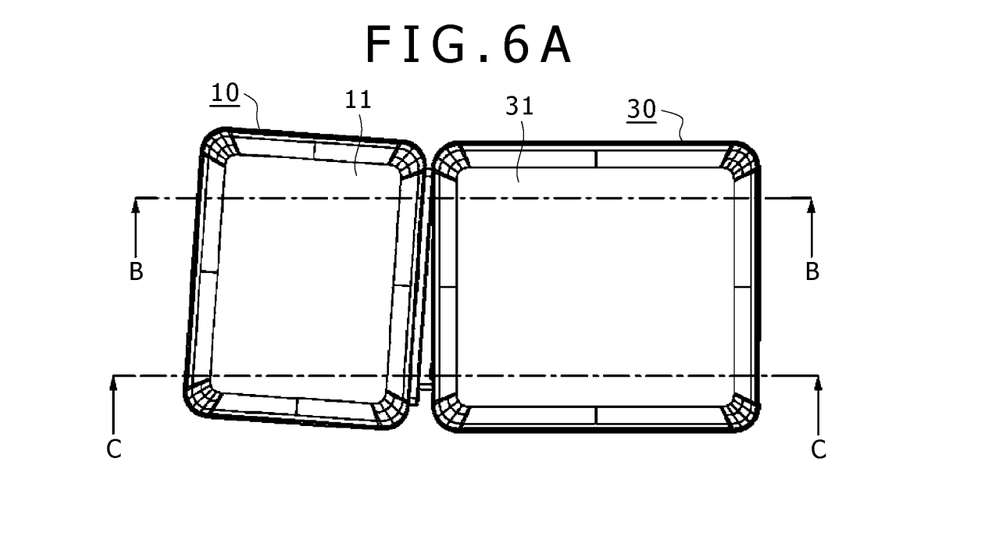
FIGS. 6A to 6C are an explanatory top-view diagram and a plurality of explanatory partial cross-sectional diagrams to be referred to in description of an operation to unlock the power supply module and the output module from each other.
Figure 6B:
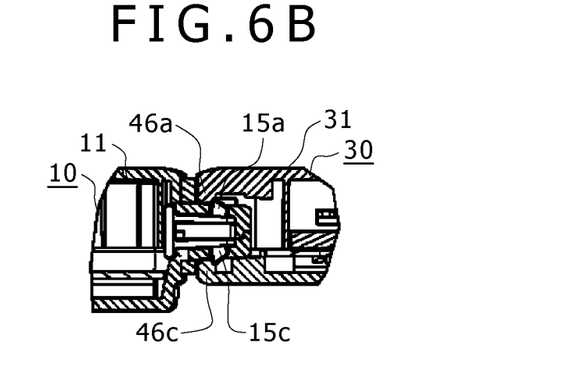
Figure 6C:
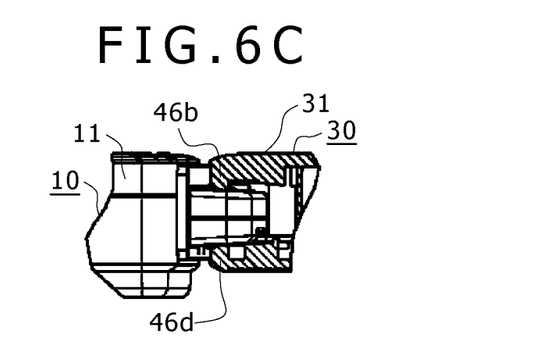

FIGS. 6A to 6C are an explanatory top-view diagram and a plurality of explanatory partial cross-sectional diagrams to be referred to in description of details of an operation to unlock the power supply module 10 and the output module 30 from each other. To be more specific, FIG. 6A is a top-view diagram showing the power supply module 10 inclined with respect to the output module 30. On the other hand, FIG. 6B is a diagram showing a cross section along a B-B line shown in FIG. 6A whereas FIG. 6C is a diagram showing a cross section along a C-C line shown in FIG. 6A. As shown in FIG. 6B, the lock pins 15a and 15c are locked to the lock projections 46a and 46c respectively. As shown in FIG. 6C, on the other hand, when the power supply module 10 is inclined with respect to the output module 30, the lock pins 15b and 15d sink toward the inner side, being taken out from the ribs of the lock projections 46b and 46d respectively. As a result, the power supply module 10 and the output module 30 are unlocked from each other. After unlocking the lock pins 15b and 15d from the lock projections 46b and 46d, a force is generated to cause the lock pins 15b and 15d to make an attempt to protrude to the outer side. Thus, since this force serves as a force assisting the removal of the power supply module 10 from the output module 30, it is possible to easily carry out the operation to change the state of locking the power supply module 10 and the output module 30 to each other to the state in which the power supply module 10 and the output module 30 are unlocked from each other.

Other Typical Output Modules

Figure 7A:
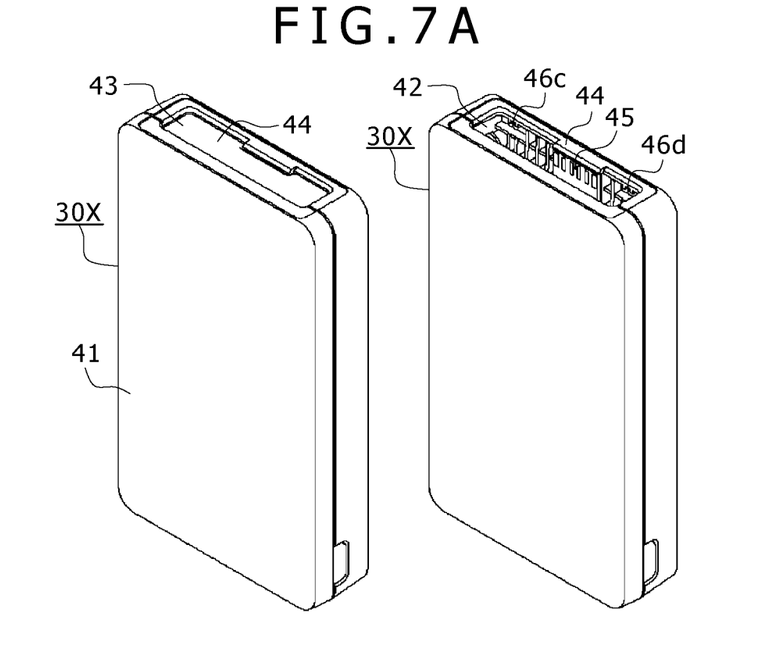
FIGS. 7A and 7B are diagrams each showing a perspective view of a typical external appearance of another output module according to the first embodiment.
Figure 7B:
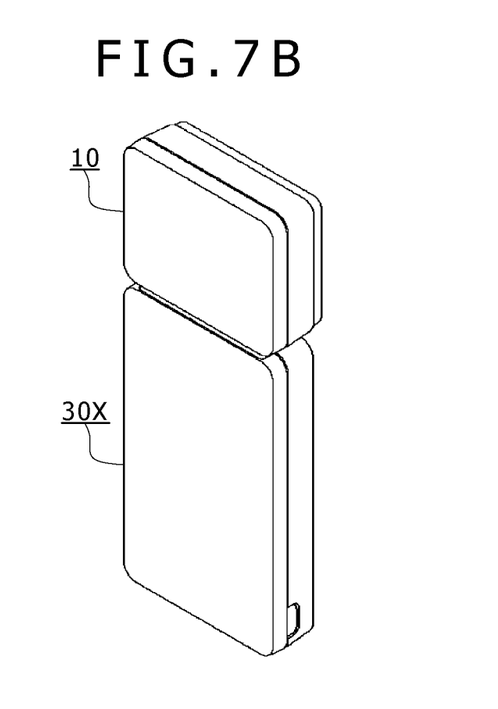

An output module 30X shown in FIG. 7A can be used as an output section which has a type different from the type of the output module 30 described so far. The output module 30X can be joined to the power supply module 10 and disjoined from the power supply module 10 with a high degree of freedom. FIG. 7B is showing an external appearance of the output module 30X and the power supply module 10 which have already been joined to each other. The output module 30X has an embedded lithium-ion secondary battery with a large electric-charge storage capacity in comparison with the electric-charge storage capacity of the lithium-ion secondary battery embedded in the output module 30. Since the lock mechanism of the output module 30X and other things concerning the output module 30X are the same as those of the output module 30, components employed in the output module 30X as components identical with their respective counterparts employed in the output module 30 are denoted by the same reference numerals as the counterparts and the identical components are not described again in order to avoid duplications of explanations.

Figure 8A:
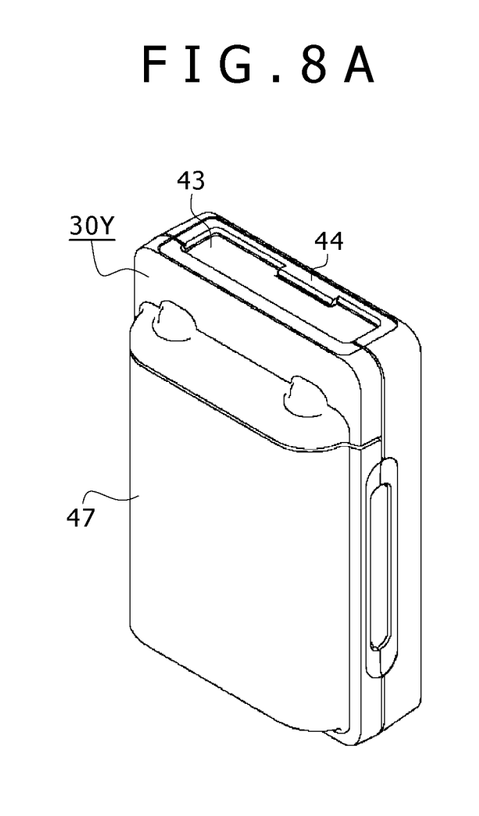
FIGS. 8A to 8C are diagrams each showing a perspective view of a typical external appearance of a further output module according to the first embodiment.
Figure 8B:
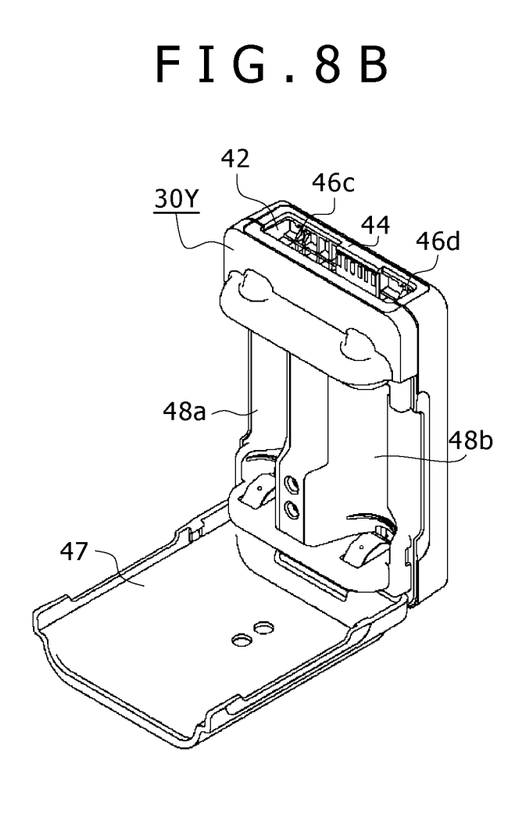
Figure 8C:
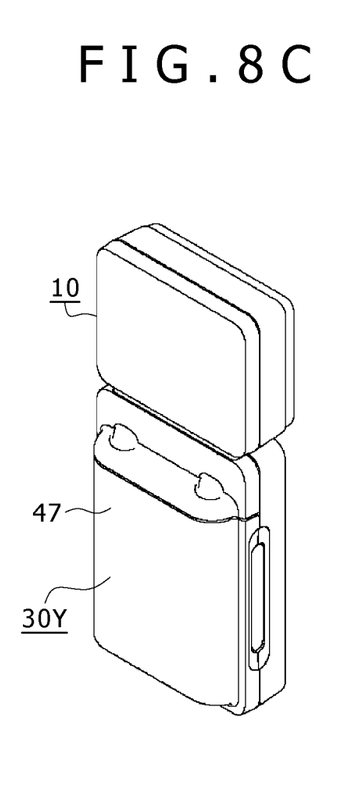

In addition, an output module 30Y shown in FIG. 8A can be used as an output section which has a type different from the type of the output module 30 described so far. The output module 30Y has a configuration that allows the output module 30Y to be joined to the power supply module 10 and disjoined from the power supply module 10 with a high degree of freedom. FIG. 8C is showing an external appearance of the output module 30Y and the power supply module 10 which have already been joined to each other. The output module 30Y employs two nickel hydrogen secondary batteries in place of the battery pack of lithium-ion secondary batteries. Each of the two nickel hydrogen secondary batteries is a size AA battery.

A portion of a cabinet for accommodating the output module 30Y is designed as a battery cover 47 which can be opened and closed with a high degree of freedom. When the battery cover 47 is opened, battery accommodation sections 48a and 48b are exposed to the external environment, allowing the nickel hydrogen secondary batteries to be mounted on the output module 30Y or removed from the output module 30Y. Since the lock mechanism of the output module 30Y and other things concerning the output module 30Y are the same as those of the output module 30, components employed in the output module 30Y as components identical with their respective counterparts employed in the output module 30 are denoted by the same reference numerals as the counterparts and the identical components are not described again in order to avoid duplications of explanations.

Each of the output modules 30X and 30Y which are described above outputs a DC power which satisfies USB specifications.

2: Modified Versions

The first embodiment has been explained above. However, implementations of the present application are by no means limited to the first embodiment. That is to say, it is possible to provide a variety of modified versions and/or applications as long as the modified versions and/or the applications are within a range that does not deviate from essentials of the present application. For example, in the case of the first embodiment, an insertion protrusion is provided on the power supply module 10 and a hollow which is continuous from the opening is provided on the output module 30. However, this first embodiment can be changed to a modified version. In this modified version, conversely, an insertion protrusion is provided on the output module 30 and a hollow which is continuous from the opening is provided on the power supply module 10.

It should be understood that various changes and modifications to the presently preferred embodiments described herein will be apparent to those skilled in the art. Such The application is claimed as follows:

1. A power supplying apparatus comprising:
a power supply section including
a first power supply circuit, accommodated in a first cabinet with a box shape, for converting an alternative-current input into a direct-current output;
an alternative-current power input section provided on said first cabinet; and
a first connection section provided on said first cabinet; and
an output section including
a second power supply circuit accommodated in a second cabinet with a box shape, for converting the direct-current output into another direct-current output;
a secondary battery accommodated in said second cabinet;
a control section accommodated in said second cabinet;
a direct-current power output section provided on said second cabinet; and
a second connection section provided on said second cabinet to be joined to said first connection section, wherein
each of said cabinets of said power supply section and said output section can be mounted and dismounted with a high degree of freedom;
said first connection section is a protrusion protruding out off the front surface of a specific one of said first and second cabinets;
said second connection section is a hollow created on the front surface of the other one of said first and second cabinets to serve as a hollow to be engaged with said protrusion;
said protrusion is an approximately oblong-shaped pole having a plurality of contact points;
said hollow is extended from an opening provided on said front surface of said other one of said first and second cabinets in the inward direction and has a plurality of contact terminals each provided at a location in close proximity to said opening;
a lock pin is provided at each of four locations in close proximity to edge corners on each of the ceiling and bottom surfaces of said protrusion;
each of said lock pins is biased by a spring so that each of said lock pins can each appear and sink with a high degree of freedom;
each of lock projections is provided on the reverse side of said opening of said hollow at a location with which one of said lock pins is brought into contact;
when said protrusion is inserted into said hollow in an insertion direction, each of said lock pins is engaged with one of said lock projections, inhibiting said protrusion from being pulled from said hollow in a direction opposite to said insertion direction; and
when said protrusion is inclined with respect to the longitudinal direction of said protrusion and said two specific lock pins are unlocked from said two lock projections so that said state of locking is ended.

2. The power supplying apparatus according to claim 1 wherein said output section comprises a plurality of output sections each having a secondary battery of a different type and can each be joined to and disjoined from said power supply section with a high degree of freedom.

3. The power supplying apparatus according to claim 1 wherein said output sections comprises a plurality of output sections each having a secondary battery with a different electric-charge storage capacity and can each be joined to and disjoined from said power supply section with a high degree of freedom.

4. The power supplying apparatus according to claim 1 wherein:
said protrusion is provided with a cutout groove which is continuous in a direction from an edge side to a stool side;
at a location in close proximity to said opening of said hollow, said hollow is provided with a bump which is continuous in the inward direction and to be engaged with said cutout groove;
said contact points are provided on the bottom surface of said cutout groove; and
said contact terminals are provided on the upper surface of said bump.

5. The power supplying apparatus according to claim 4 wherein:
the width on the edge side of said cutout groove is made slightly large in comparison with the width on the stool side of said cutout groove; and
on said edge side of said cutout groove, a gap is created between a groove wall of said cutout groove and a side wall of said bump.

6. The power supplying apparatus according to claim 4 wherein said protrusion has round corners at edges on the upper, lower, left-hand and right-hand sides.

7. A power supplying apparatus comprising:
power supply means including
a first power supply circuit, accommodated in a first cabinet with a box shape, for converting an alternative-current input into a direct-current output;
alternative-current power input means provided on said first cabinet; and
first connection means provided on said first cabinet; and
output means including
a second power supply circuit accommodated in a second cabinet with a box shape, for converting the direct-current output into another direct-current output;
a secondary battery accommodated in said second cabinet;
control means accommodated in said second cabinet;
direct-current power output means provided on said second cabinet; and
second connection means provided on said second cabinet to be joined to said first connection means, wherein
each of said cabinets of said power supply means and said output means can be mounted and dismounted with a high degree of freedom;
said first connection means is a protrusion protruding out off the front surface of a specific one of said first and second cabinets;
said second connection means is a hollow created on the front surface of the other one of said first and second cabinets to serve as a hollow to be engaged with said protrusion;
said protrusion is an approximately oblong-shaped pole having a plurality of contact points;
said hollow is extended from an opening provided on said front surface of said other one of said first and second cabinets in the inward direction and has a plurality of contact terminals each provided at a location in close proximity to said opening;

a lock pin is provided at each of four locations in close proximity to edge corners on each of the ceiling and bottom surfaces of said protrusion;

each of said lock pins is biased by a spring so that each of said lock pins can each appear and sink with a high degree of freedom;

each of lock projections is provided on the reverse side of said opening of said hollow at a location with which one of said lock pins is brought into contact;

when said protrusion is inserted into said hollow in an insertion direction, each of said lock pins is engaged with one of said lock projections, inhibiting said protrusion from being pulled from said hollow in a direction opposite to said insertion direction; and when said protrusion is inclined with respect to the longitudinal direction of said protrusion and said two specific lock pins are unlocked from said two lock projections so that said state of locking is ended.

* * * * *